(12) United States Patent
Yamamiya

(10) Patent No.: US 6,311,867 B1
(45) Date of Patent: Nov. 6, 2001

(54) CARD ELEVATOR AND DISPENSER

(75) Inventor: Takahito Yamamiya, Iwatsuki (JP)

(73) Assignee: Asahi Seiko Co., Ltd., Tokyo (JP)

( * ) Notice: Subject to any disclaimer, the term of this patent is extended or adjusted under 35 U.S.C. 154(b) by 0 days.

(21) Appl. No.: 09/439,400

(22) Filed: Nov. 15, 1999

(30) Foreign Application Priority Data

Nov. 16, 1998 (JP) .................................. 10-363757

(51) Int. Cl.[7] .............................. A01C 9/00; B23Q 7/04; G07F 11/16
(52) U.S. Cl. .................... 221/217; 221/226; 221/229; 221/258; 221/275
(58) Field of Search .................... 221/217, 226, 221/227, 229, 275, 258; 271/106, 155

(56) References Cited

U.S. PATENT DOCUMENTS

| | | | |
|---|---|---|---|
| 4,558,803 | * 12/1985 | Draper et al. | 221/229 X |
| 4,993,587 | 2/1991 | Abe . | |
| 5,474,288 | * 12/1995 | Lo et al. | 271/155 X |
| 5,556,252 | * 9/1996 | Kuster | 271/155 X |
| 5,842,598 | * 12/1998 | Tsuchida | 221/258 X |
| 6,082,728 | * 7/2000 | Ubayashi | 271/106 X |
| 6,102,248 | * 8/2000 | Yamamiya | 221/211 X |

FOREIGN PATENT DOCUMENTS

| | | |
|---|---|---|
| 0 910 054 A1 | 4/1999 | (EP) . |
| 2 601 267 A1 | 1/1988 | (FR) . |

OTHER PUBLICATIONS

Kiko Hiroshi Jan. 23 1996 Automatic Delivery Method and Device of Paper Sheets Patent Abstracts of Japan 08 02 0452.

* cited by examiner

Primary Examiner—Christopher P. Ellis
Assistant Examiner—Gene O. Crawford
(74) Attorney, Agent, or Firm—McGlew and Tuttle, P.C.

(57) ABSTRACT

Equipment is provided for issuing IC cards packed in transparent films, etc. without damaging the card or the packaging. The equipment includes a dispenser which can be loaded with s large number of cards in simple and at short time. An elevator for the card bodies is provided with a flexible rack a driving mechanism for moving the rack in up and down directions, a movable base which arranged at the bottom end, for carrying card bodies. The dispenser includes the elevator with the movable base as well as a fan for taking up the top most card body on the movable base and a tire or wheel for sending out the card body which is taken up at the fan.

10 Claims, 10 Drawing Sheets

CARD ELEVATOR AND DISPENSER

FIELD OF THE INVENTION

This invention relates to a dispenser for sending out cards one by one. Especially, this invention relates to a dispenser for surely sending out cards each as one sheet, without damaging a card body of little thickness. More particularly, the invention relates to equipment for sending out IC cards or cards in transparent film or the like.

BACKGROUND OF THE INVENTION

Card dispensers for IC cards have been variously developed. For example, a card dispenser by this applicant has been disclosed in Japanese Utility Model publication 7-26276 (Japanese Utility Model Application 63-60147). U.S. Pat. No. 4,993,587 is based on this Japanese application. In the above patent specification, a dispenser for thin cards such as telephone cards, or the like is disclosed. In the equipment disclosed, a rubber roller is used in order to send out a thin card. In addition, the equipment has been devised so that the sending out of the thin cards in a piled state, for example two cards, may be prevented.

As descried above, conventional card dispensers have been considered only as to thin cards such as telephone cards, etc. Therefore this does not adapt to a slightly thicker card in order to surely send these out one by one. For example, IC cards and cards with a manual, which are together packed in transparent films, etc. can not effectively be sent out. It was anticipated that the packaging film, etc. would be damaged, since a rubber roller arrangement is used. Further, in conventional dispensers a part, which stores a plurality of cards or a cassette part, is included in the equipment main body. Therefore, design changes, etc. had to be made in cases which the size and type of cards, etc. were changed.

As a result, improvements are required in view of the management difficulties and in order to provide a dispenser for many types of cards.

SUMMARY AND OBJECTS OF THE INVENTION

This invention has been developed, considering the above problems in prior art. The primary object of this invention is to provide equipment in which thick cards are surly sent out one by one without damages.

It is a further object of this invention to provide equipment in which IC cards and/or cards with a manual, togther packed in transparent films, etc. are sent out without damages.

It is still another object of this invention to provide a dispenser which can be loaded with a large number of cards in a simple and in a short time.

Further, it is an object of this invention to provide a dispenser in which dispensing problems for dispensing various cards are not present and in which convenience in the management of the cards is enhanced.

According to the invention an elevator mechanism for card bodies includes a flexible rack, a driving means for moving the rack in up and down directions and a movable base, which is arranged at the bottom end, for carrying a card bodies. The movable base is remove-ably arranged at the bottom end of rack.

The movable base is mounted in a cassette for the card bodies.

According to another aspect of the invention, a dispenser for card bodies is provided with a flexible rack, a driving means for moving the rack in up and down directions, a movable base, which is arranged at the bottom end, for carrying a card bodies, a fan for intake or take up of the most top card body on the movable base; and a tire or wheel for sending out the card body which is absorbed or taken up at the fan. The movable base may be remove-ably arranged at the bottom end of the rack.

The movable base may be mounted in a cassette for card bodies.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
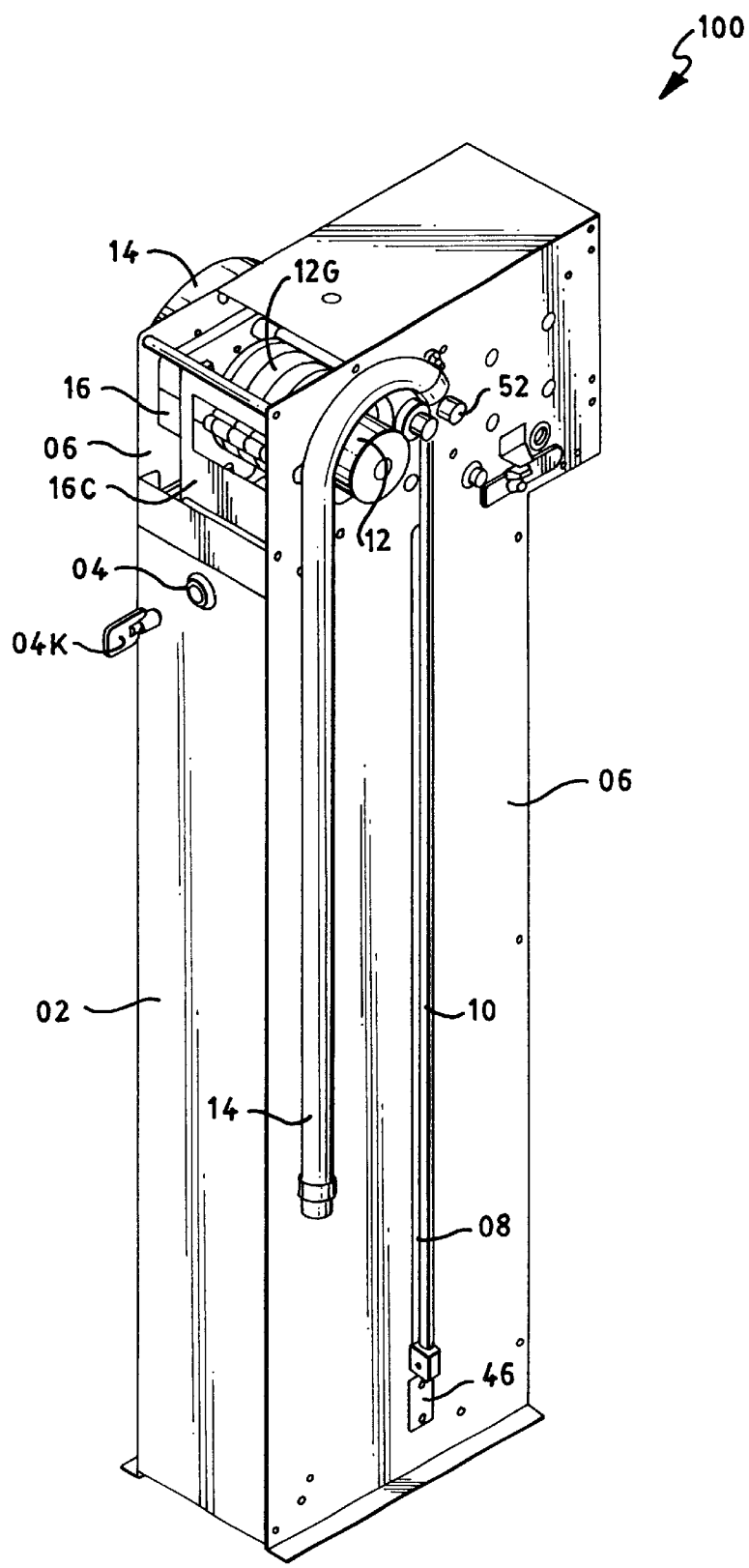
FIG. 1 is a perspective view of card body disposition equipment according to an embodiment of the invention.

Referring to the drawings in particular, FIG. 1, shows an oblong box that is a dispenser generally designated 100. The dispenser 100 is for dispensing card bodies. An oblong board shown at the left in FIG. 1 is a door 02 for storing a cassette. An upper part 04 of door 02 is an insertion mouth for a key. Insertion mouth 04 accepts key 04K for opening and closing of door 02 for storing a cassette. The boards which are shown in FIG. 1 to the side are side boards 06 which constitute parts of dispenser 100. The side boards 06 are paired facing each other.

At positions along the facing boards 06, upright elongate holes 08 extend in an up and down direction. Upright elongate and slender flexible rack 10, shown in FIG. 1, is located centrally of each elongate hole and is made of resin. Flexible racks 10 each constitute a part of the lift mechanism or means and are able to be moved in up and down directions along oblong holes 08. FIG. 1 also shows, in an upper region, an electric motor 12 for lifting. Motor 12 constitutes an essential part of the lift mechanism or means, and the transfer in the vertical direction of each rack 10 is controlled. Stick type pipe 14 shown centrally in FIG. 1, stores an associated one flexible rack 10.

Small lever 16 shown at the upper left of FIG. 1 is a for initiating operation. This lever 16 manipulates both the combination and the release between gear mechanism elements meshing each rack 10 and motor 12 (described below).

Figure 2:
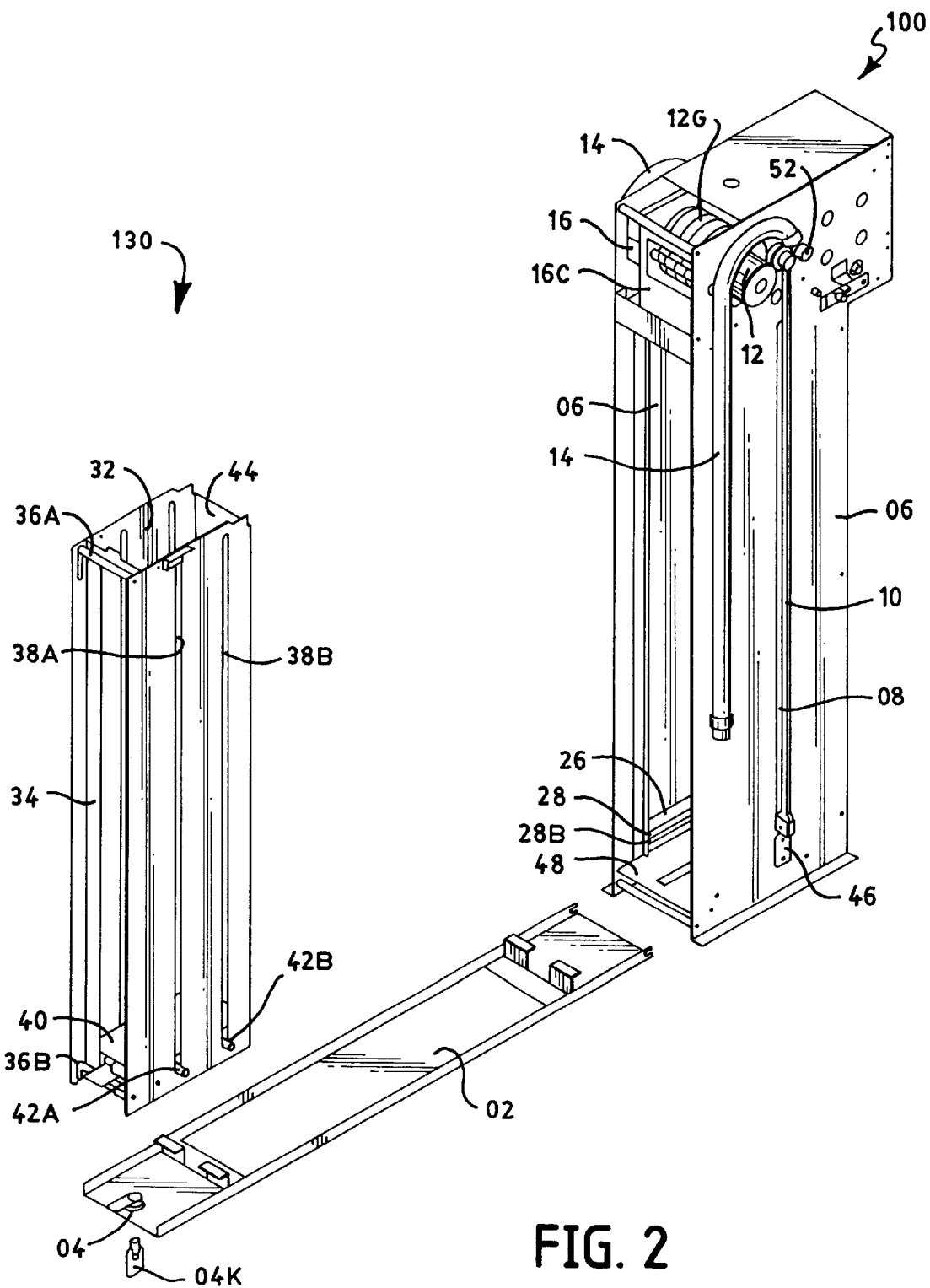
FIG. 2 is a taken apart view showing a cassette detached from the equipment of FIG. 1.
Figure 4:
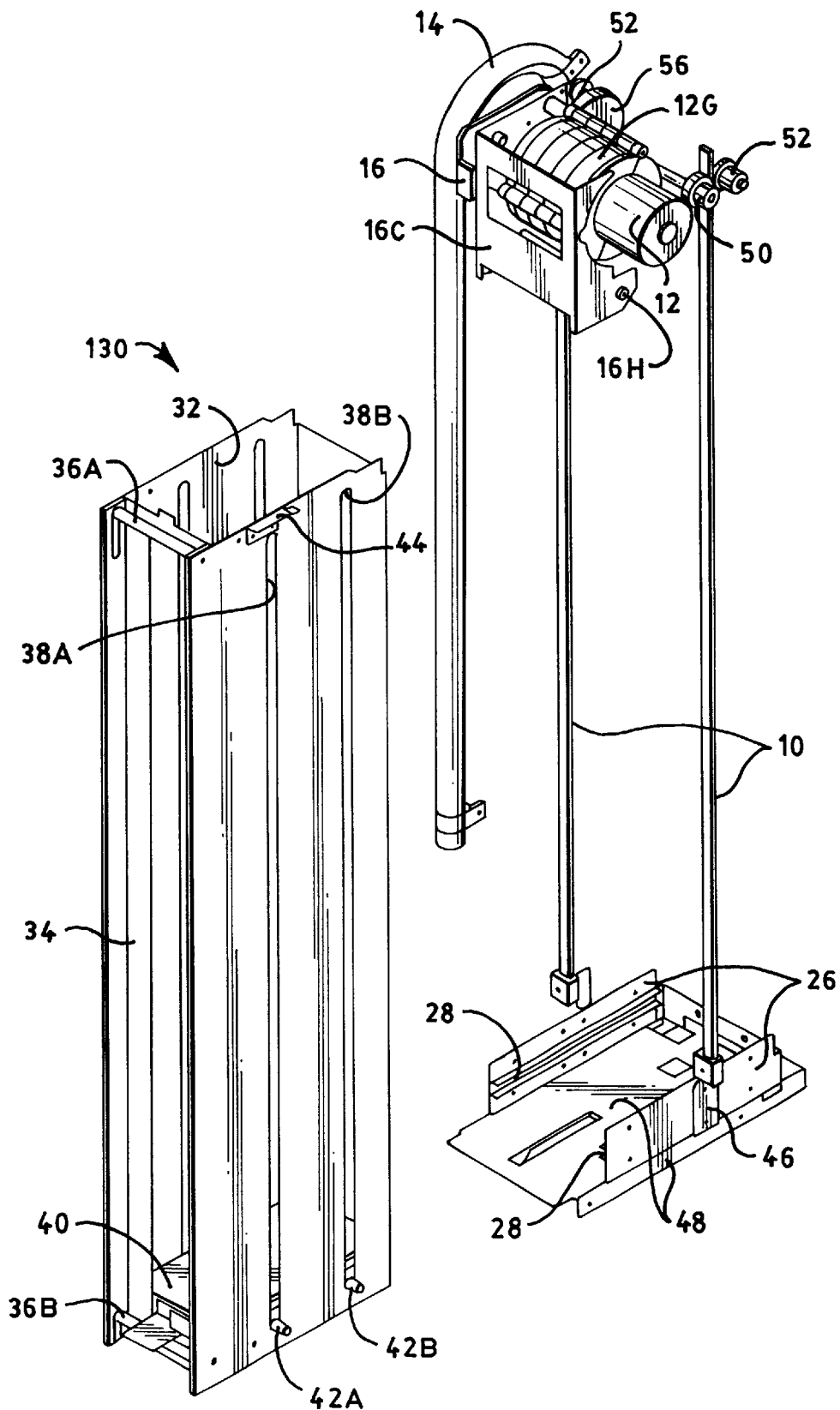
FIG. 4 is a taken apart perspective view which shows the cassette and the lift structure of FIG. 2.

FIG. 2 shows the condition in which the cassette 130 is detached from dispenser 100. The cassette 130 is an oblong box structure. This cassette 130 stores a number of card bodies, by piling them up or stacking them. The cassette 130 is formed with a main body 32 with an angle tube shape as shown in FIG. 4. Two oblong holes 38A and 38B are opened at each side of main body 32.

The main body 32 has oblong holes 38A and 38B extending in parallel in an up and down direction, each on a side facing the other. Main body 32 inside is equipped with boxy movable base 40, and a plurality of card bodies are piled up and carried on this movable base 40. Two shafts 42A and 42B respectively penetrate into the movable base 40. Each of the two shafts 42A and 42B respectively penetrates into each of the two oblong holes 38A and 38B. Therefore, each end of the shafts 42A and 42B respectively protrudes from the cassette main body 32. A door 34 of cassette 130 is a long square ring board as shown in FIG. 2 at the left.

Figure 3:
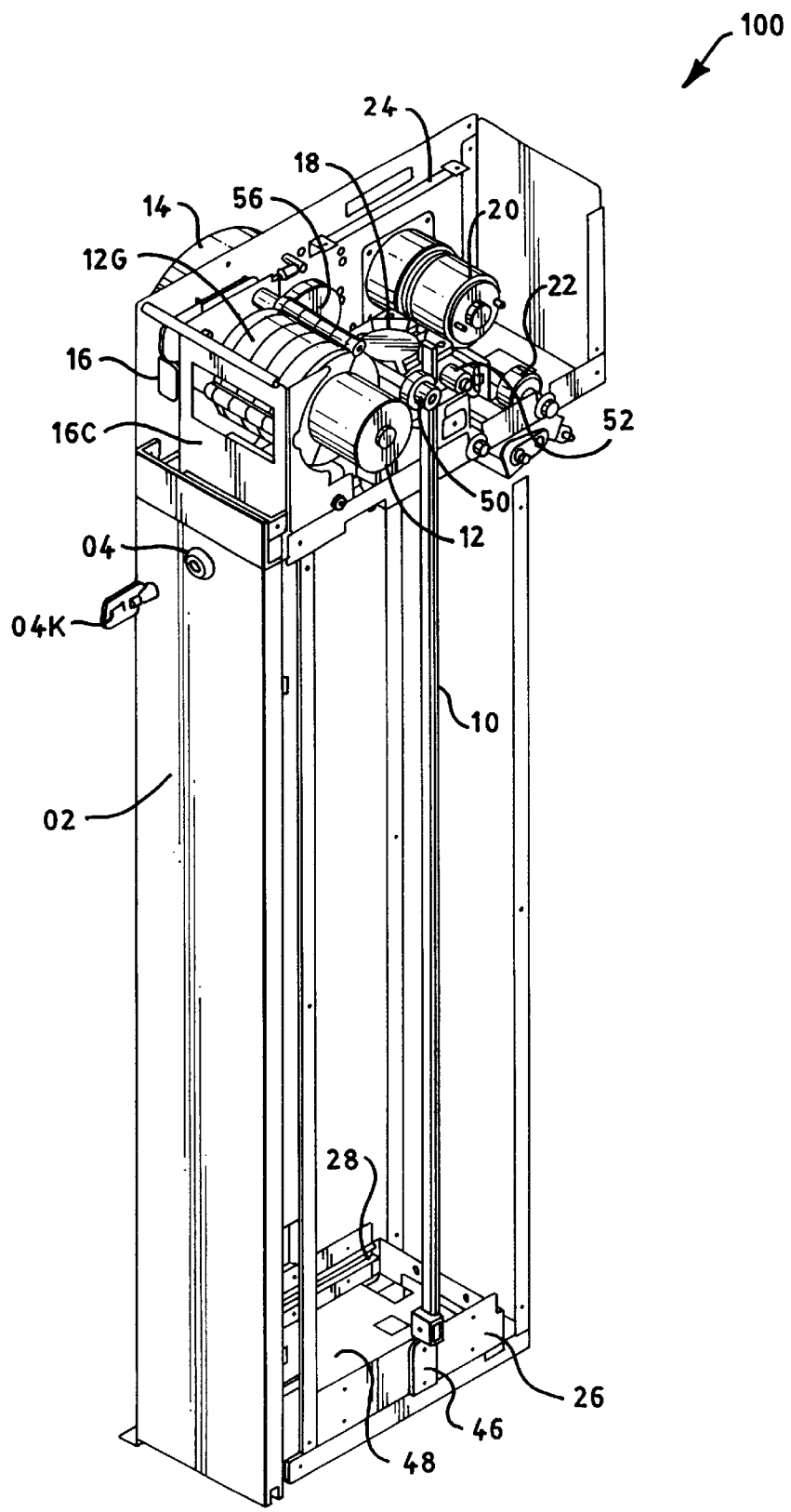
FIG. 3 is a partially cut-away perspective view which shows the feature inside the equipment of FIG. 1.

FIG. 2 shows an upper short shaft 36A and lower short shaft 36B which are used for detachably fixing the door 34 to the main bodies 32. A small plate 44 of the upper region of cassette main body 32 is for switching. When the cassette 130 is installed into the dispenser 100, the plate 44 is used to place the dispensing operation in a stand-by mode. The upper part of FIG. 3 shows a fan 18 for air suction with fan motor equipment forming the attraction means. At the lower part of the fan 18, there is an opening (not shown) for the intake of a card body.

FIG. 3, at the upper part, shows an electric motor that drives a pair of rollers 22 for sending out the card bodies. Dispensing rollers 22 contact the upper surface of card body at the dispensing time. In the upper part of FIG. 3 there is shown a stationary member 24 used for fixing a substrate 70 which controls electric motors and circuits, etc. (see FIG. 6). FIG. 3 also shows, in a lower region, a laid down U form frame 26 for lifting, and constitutes a part of lift means. A level pair of grooves 28 are formed at inside walls which face each other in the frame 26. The structure shown in FIG. 4 at the right side is lift means.

As noted above that this lift means has the frame 26 for lifting, which is a laid down U form. As noted above paired grooves 28 have been formed in the frame 26 inside. At the mounting of cassette 130, the outside end of each shaft 42A and 42B is respectively inserted into each groove 28 thereof. In addition, it was also described above that the lift means has a pair of flexible racks 10. Each of slender racks 10 is respectively fixed at each of paired side walls of frame 26 and extends to the upper direction (see FIG. 4). A stay 46 (FIG. 4 lower part) is used for fixing the rack 10 on frame 26. A fixed base board 48 is provided as a rectangular board shown under frame 26.

Figure 5:
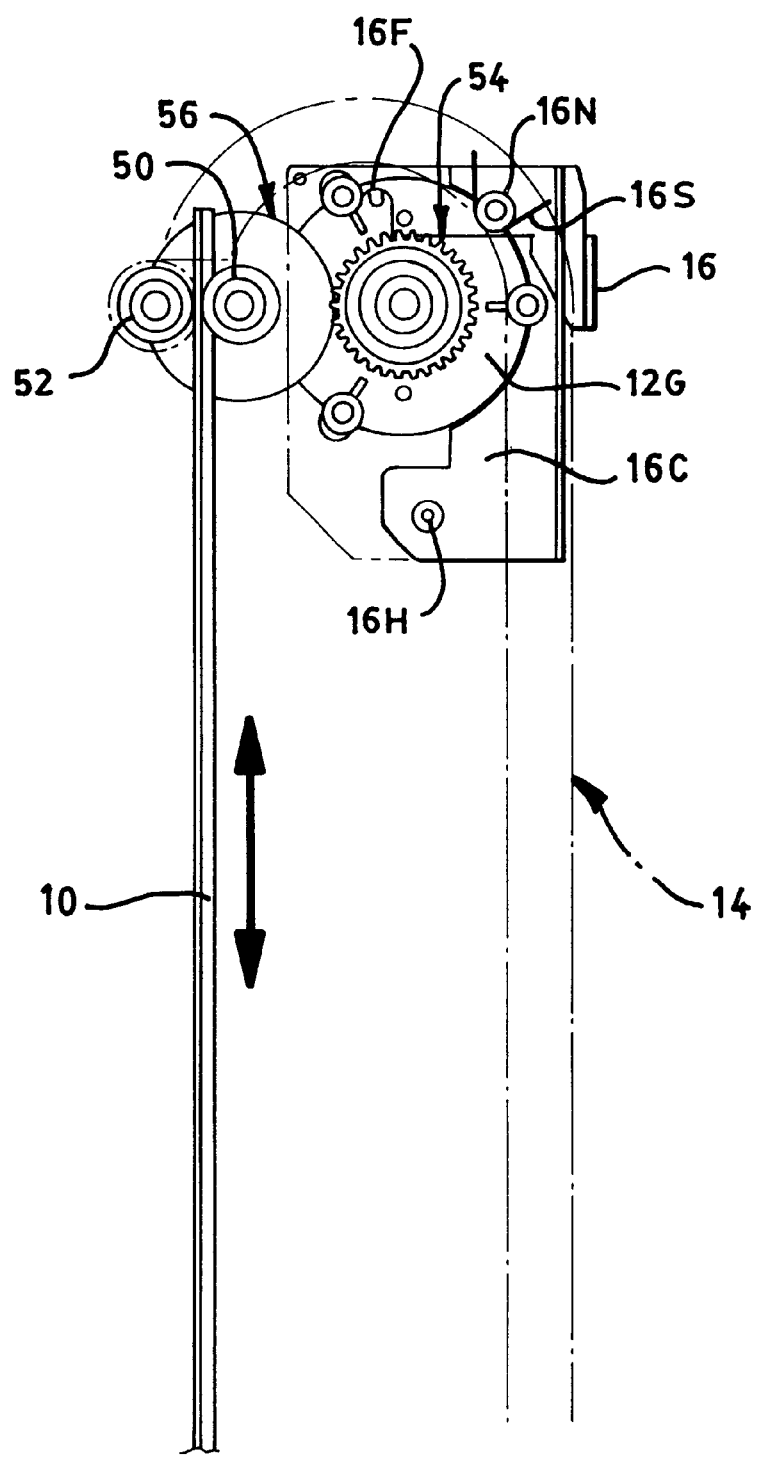
FIG. 5 is an explanatory view which shows the main section of the lift structure which is shown in FIG. 4.

The lift means has a drive mechanism, as shown in FIG. 5. FIG. 5 also shows the main section of the drive mechanism. The lift drive mechanism engages with two racks 10 and moves the frame 26 in upper direction. The lift drive mechanism has the electric motor 12 and a primary gear mechanism fixed on the driving shaft of this motor. In addition, this lift drive mechanism has a second gear mechanisms which engages respectively with paired racks 10. The second gear mechanism consists of paired pinions 50 and rollers 52 for pressing, etc. The lift drive mechanism has the lever 16.

The lever 16 freely engages the primary gear mechanism with the second gear mechanism each other. A flat gear 54 (shown in the upper part FIG. 5) has thirty teeth and is fixed on the driving shaft of electric motor 12 for lifting. A flat gear 56 (shown in the upper part of FIG. 5) has forty teeth and engages with gear 54 freely. This gear 56 is fixed on the same shaft as pinion 50. Pinion 50 is engaged with flexible rack 10. Roller 52 presses rack 10 which engages with pinion 50. The arrow shown in FIG. 5 indicates the transfer of up and down directions of rack 10.

Figure 6:
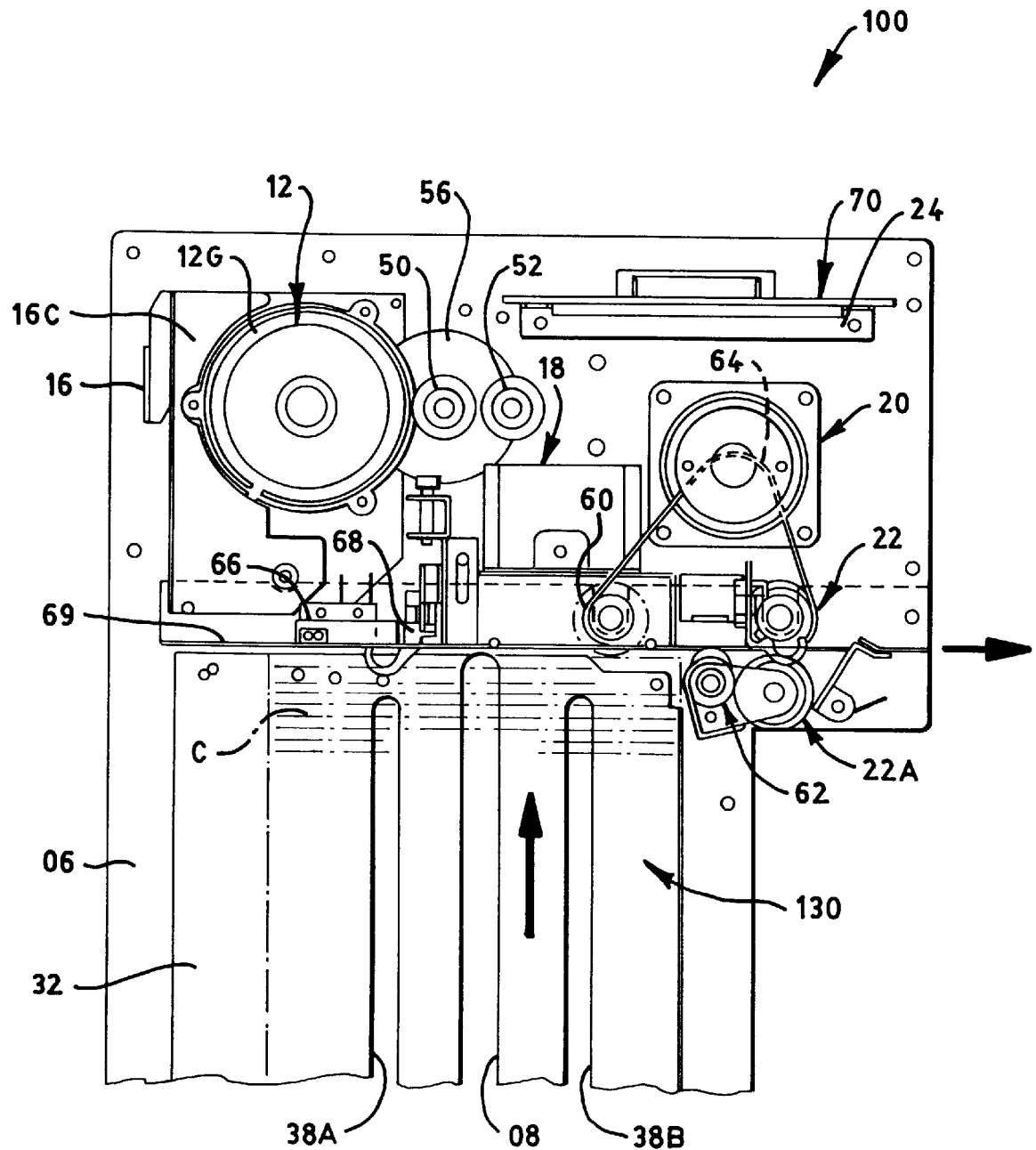
FIG. 6 is a front elevation view which shows the attraction structure and the delivery structure of FIG. 3.

FIG. 6 shows the attraction means and delivery means. In the center of FIG. 6, there is shown the fan 18 for adsorption which is a fan motor equipment and constitutes the attraction means. The delivery means has a tire 60 made of rubber. This tire 60 contacts the upper surface of card body C and sends out this card body C, which was adsorbed at the fan 18. The delivery means has rollers 22 and support rollers 22A for dispensing, respectively. These rollers 22 and 22A sandwich and send out the card body C which is transported by the tire 60. In addition, the delivery means has inversion rollers 62 for preventing the double feed therefrom.

The inversion rollers 62 engage with the support rollers 22A and contact with the underside of transported card body C. When card body C is dispensed, the inversion rollers 62 in this practical example prevent two card bodies C from being sent out. The delivery means has drive means such as electric motor 20 and a belt 64 (see FIG. 6). The belt 64 is extended on pulleys (not shown) which are arranged at the outside of the side board 06. This drive means rotates the tire 60 and rollers 22 for dispensing in the same direction.

For the attraction means and delivery means, known devices of the applicant's may be used and employed. For example, it is possible to use the technology described in Japanese patent laid-open 10-1235 publication (Japanese patent application 8-188006). The technology described in this publication is based on thin sheet bodies such as paper money and telephone card etc. being dispensed. This technology uses only paired rollers which send out a sheet body by the holding action, however, a means including the inversion roller 62 is not provided. A small boxy switch 66 is shown in FIG. 6 in the center. This switch 66 is turned on by a small plate 44 (see FIG. 4).

When cassette 130 is installed in dispenser 100, switch 66 is turned on and the dispensing operation placed in stand-by mode. A light switch 68 of the actuator style is provided near the switch 66. The light switch 68 is a light sensor and light interrupter. When the most top card body which is taken up or absorbed at the fan 18 comes to the desired position, light switch 68 makes the electric motor 12 stop. Near the dispensing rollers 22 and 22A, light switch 68B is provided (see FIG. 9). This light switch 68B makes the fan 18 stop, when the dispensed card body is inserted between rollers of 22 and 22A.

The substrate 70 for control is fixed by stationary member 24. A plurality of piled up card bodies are transported above by the lift means. Only the most top card body of a plurality of card bodies transported above is adsorbed. In addition, the adsorbed or taken up card body is sent out by the dispensing means in this practical example. As this result dispensing of each one card body without damage is attained.

The lift means includes racks 10, electric motor 12, frame 26, grooves 28, movable base 40, shafts 42A and 42B, pinion 50, press roller 52, etc. The delivery means includes tire 60, rollers 22 and 22A, inversion roller 62, motor 20, belt 64, etc. Cassette 130 is mounted/dismounted freely on the lift means in dispenser 100 (see FIG. 4). Therefore, in this practical example, it is possible to separately prepare the cassettes in proportion to types and sizes, etc. of card bodies.

When the type, etc. of card body is to be change, the cassette in proportion to the change can be used immediately. This practical example provides the use of the cassette with free mounting/dismounting so that a large number of card bodies can be stored in a short time and easily. Significant convenience is obtained in controlling various card bodies.

Another example of the invention is shown in FIGS. 7–10. As is clear from the preceding, the lift drive mechanism in FIG. 5 is an enlarged view directed at the lift drive mechanism in FIG. 4 from the back. On the driving shaft of electric motor 12, a small flat gear 54 is fixed, for a deceleration gear train 12G. The drive mechanism is housed integrally in a little large U-form case 16C (see FIG. 4). Then, this case 16C is rotatably hinged at 16H between side boards 06.

Figure 7A:
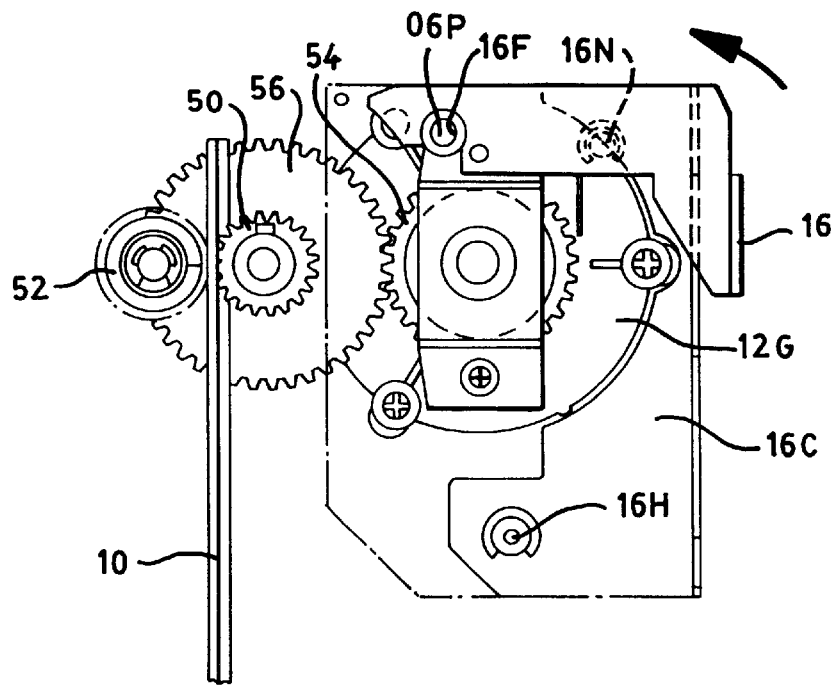
FIG. 7A is an explanatory view which shows an operating condition of the lift structure of FIG. 5
Figure 7B:
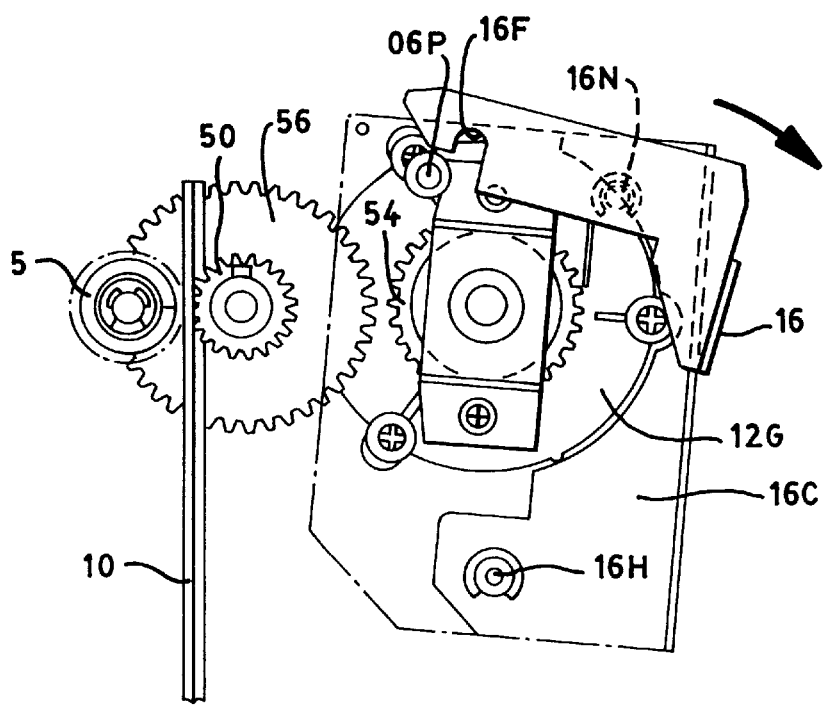
FIG. 7B is an explanatory view which shows an operating condition of the lift structure of FIG. 5.

Lever 16 for operation is a small pistol form, and the center thereof is hinged at 16N on case 16C (see FIG. 7). Then, hook 16F is formed at the tip of lever 16 (see FIG. 5). A small circle (FIG. 7 upper part) is a protrusion 06p which is formed on the inside wall of side board 06. This protrusion 06P can be freely meshed with hook 16F. Case 16C becomes swingable around the hinge shaft 16H within the dispenser 100. When the hook 16F of lever 16 engages with the protrusion 06P, gear 54 will engage with large gear 56 (see (A) in FIG. 7).

The lever 16 is pressed and pulled, resisting a springs 16S (see FIG. 5), the hook 16F extends off from protrusion 06P (see (B) of FIG. 7). In this case, the meshing between small gear 54 and large gear 56 will be moved away as a result. When the lever 16 is pushed, resisting the weight of case 16C, hook 16F engages with protrusion 06P. Small gear 54 will engage with large gear 56. Therefore, by the operation of lever 16, it will be able to control the interlock and release between racks 10 and motor 12.

As shown in FIG. 2, when cassette 130 is drawn from dispenser 100, lever 16 is manipulated. Lever 16 is lowered and small gear 54 is separated from large gears of 56, and then frame 26 is lowered. Moving away the meshing between small gear 54 and large gear 56, the moveable plate 40 is lowered. As a result of this, each outside end of shafts 42A and 42B comes off from cuts 28B (see FIG. 2) on dispenser 100. It is of course advantageous that, when a spring is arranged on the hinge shaft 16H, hook 16F may easily come off from protrusion 06P.

The simple control the drive of racks 10 is provided with the operation of lever 16. In FIG. 8, a card body staggering mechanism is shown, which smooths the disposition of card body. The mechanism pushes the tail edge of the most top card body which is piled up within the cassette 130. The above-mentioned card body staggering mechanism is arranged on the rear end division of a board 69 for installing the fan 18. A small solenoid 71 is installed on one side of mounting board 69 rear end division. A small crossbar 73 is fixed on the plunger 72 of solenoid 71, and moves back and forth freely (see FIG. 9).

Figure 8A:
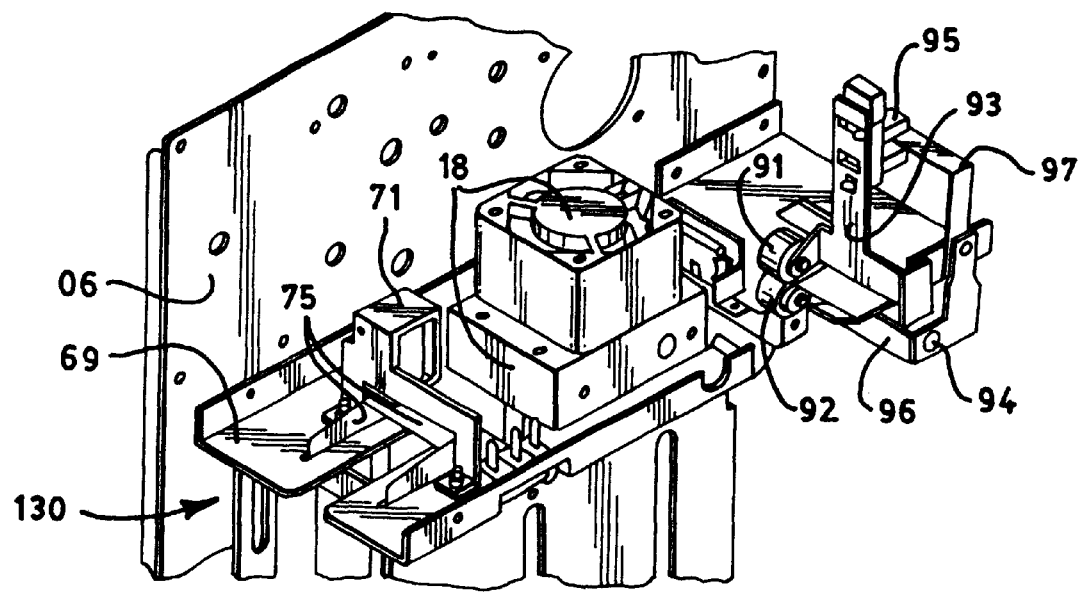
FIG. 8A is a perspective view which shows an operating condition of card body staggering mechanism.
Figure 8B:
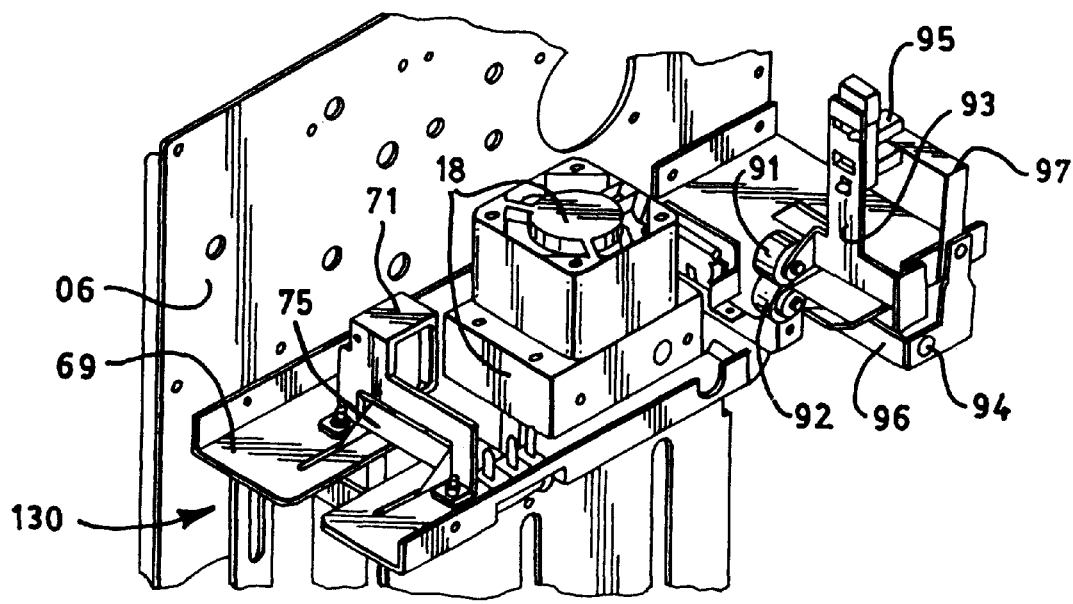
FIG. 8B is a perspective view which shows an operating condition of card body staggering mechanism.

A staggering piece 75 of U-shaped form, shown in FIG. 8 (left part) is for a card body. The center of staggering piece 75 is placed swingably on board 69, a little long hinge shaft 76. In addition, an end part of the staggering piece 75 is coupled to the crossbar 73 via a long hole (not shown). Thus, plunger 72 is drawn, when solenoid 71 put in an on state. As a result, the staggering piece 75 is down around hinge shaft 76, and pats the tail part of the card body (see of FIG. 8B).

When solenoid 71 is put in an off state, plunger 72 is pushed out. In this case, the staggering piece 75 is up around hinge shaft 76 and is stored on mounting board 70 (see FIG. 8A). Therefore, when solenoid 71 is changed between an on and off state, the staggering piece 75 will lightly strike the tail part of the card body.

Figure 9:
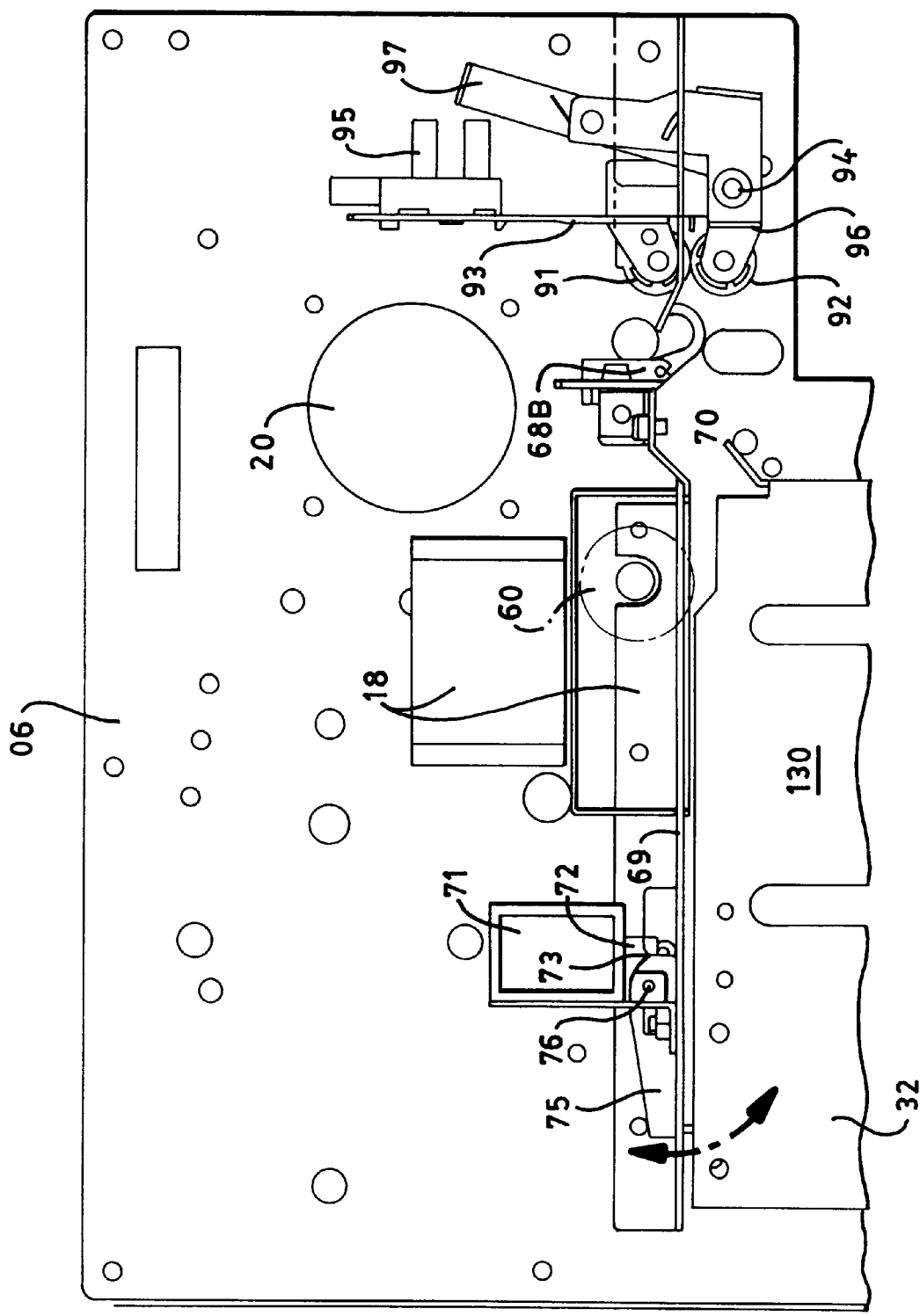
FIG. 9 is a front elevation view which shows a modification of FIG. 6.
Figure 10A:
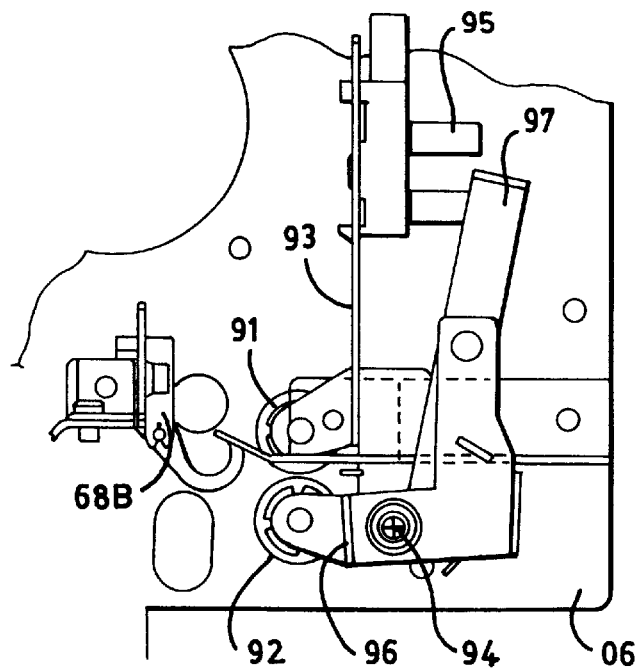
FIG. 10A is an explanatory drawing which shows an operating condition of the main section of FIG. 9.
Figure 10B:
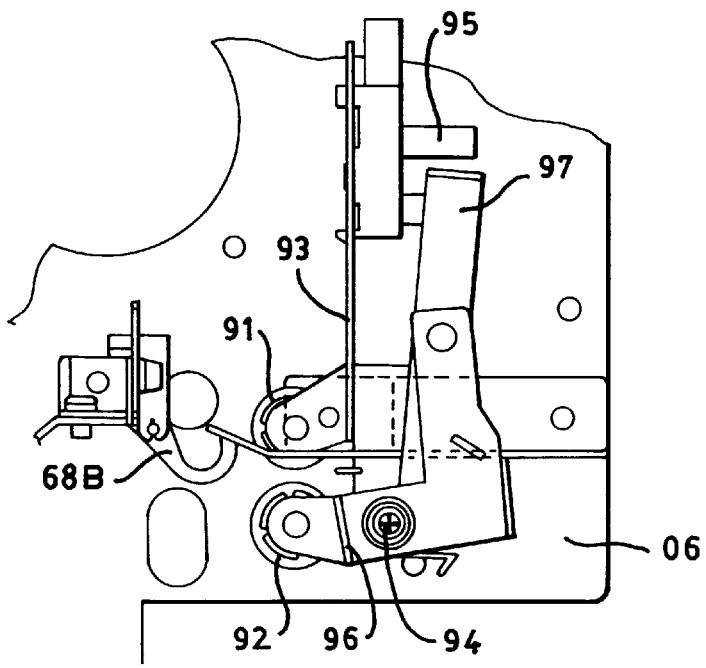
FIG. 10B is an explanatory drawing which shows an operating condition of the main section of FIG. 9.

At the right part of FIG. 9, the sensor mechanism for the card body is shown. By this sensor mechanism, the number of sheet feeds of sent-out card bodies is detected, one sheet or two sheets concretely. The sensor mechanism has small rollers 91 and 92 which hold one sent-out card body. The upper roller 91 is arranged and freely rotated at an inner edge of a reversed-T type mounting piece 93 (see FIGS. 8A and 8B). The outside edge of the mounting piece 93 is pivoted at 94 on the side board 06.

A light sensor 95 has been installed at the center edge of mounting piece 93. The bottom roller 92 is arranged and freely rotated at an inner edge of laid-L form mounting actuation piece 96 (see FIGS. 8A and 8B). Then, the central of mounting piece 96 is pivoted at 94 on the side board 06. At the outside edge of the mounting actuation piece 96, a reversed-L shape actuation piece 97 is pivotably mounted with a spring (not shown). This actuation piece 97 is for providing precise adjustment in proportion to the thickness of the card body.

The driven away card body is adsorbed or taken up first at fan 18. Next, it is sent out by tire or roller 60 (refer to FIG. 9). The card body sent out by tire 60 is sent between paired rollers of 91 and 92. When the sent card body is one sheet, the bottom roller 92 is moved a little, resisting a spring (not shown) (see FIG. 10A). At this time, the actuation piece 97 is only moved a little and it is not detected by the light sensor 95. When the sent card body is two sheets, the bottom roller 92 is moved, resisting a spring (not shown) (see FIG. 10B). As a result, the actuation piece 97 is detected by light sensor 95 and two sheets of the card body are detected. Paired rollers 91 and 92 can be moved around the pivot 94 integrally. Therefore, the arrangement is able to surely detect two sheet feeds of card bodies, even if the type of card body is changed. Concretely, two sheet feeds of card bodies can be surely detected, even if thickness and size, etc. of the card body are changed.

The invention provides a sure distribution of card bodies, even very thin bodies, each single sheet without damage. It is particularly advantageous to surely distribute an IC card packed in transparent film without damage. Further, according to this invention, cassettes can be used and therefore a large number of card bodies can be placed therein easily and in a short time. In addition, this provides a significant convenience as to the management of the various card bodies While specific embodiments of the invention have been shown and described in detail to illustrate the application of the principles of the invention, it will be understood that the invention may be embodied otherwise without departing from such principles.

What is claimed is:

1. A card body elevator comprising:
    a housing;
    a rack extending from adjacent to an elevator top to adjacent to an elevator bottom;

a pinion supported by said housing and engaging said rack for moving said rack in up and down directions;

a roller supported by said housing and engaging said rack for pressing the rack into engagement with said pinion;

a frame fixed to a lower portion of said rack; and a base for carrying cards, said base being attachable to said frame for moving up and down with said rack, said base having a connection part and said frame having a connection element connectable with said connection part for removeably connecting said base to said frame.

2. A card body elevator according to claim 1, wherein said movable base is mounted in a card body cassette.

3. A card body elevator according to claim 1, wherein said connection part comprises a protruding part on said base and said connection element comprises a groove, receiving said protruding part slidably.

4. A dispenser for cards, said dispenser comprising:

a dispenser housing;

a pinion supported by said housing and engaging said rack for moving said rack in up and down directions;

a rack extending from adjacent to an elevator top to adjacent to an elevator bottom;

a roller supported by said housing and engaging said rack for pressing the rack into engagement with said pinion;

a frame fixed to a lower portion of said rack;

a base for carrying cards, said base being attachable to said frame for moving up and down with said rack, said base having a connection part and said frame having a connection element connectable with said connection part for removeably connecting said base to said frame;

a fan for taking up the top most card body on said movable base; and a roller for sending out the card body which is taken up at said fan.

5. A dispenser for cards according to claim 4, wherein said movable base is mounted in a card body cassette.

6. A dispenser for cards according to claim 4, wherein said connection part comprises a protruding part on said base and said connection element comprises a groove, receiving said protruding part slidably.

7. A card body dispenser comprising:

a dispenser housing;

a lift structure connected to said dispenser housing and including a driving mechanism with a flexible rack, a motor, a pinion driven by said motor and a roller supported by said housing and engaging said rack for pressing the rack into engagement with said pinion for moving said rack in up and down directions;

a frame fixed to a lower portion of said rack;

a movable base positioned removably connected to said frame, said movable base having a card sized surface for carrying card bodies;

a connection element on said frame;

a connection part on said base, said connection part connecting with said connection element wherein said base is removeably connected to said frame;

a card take up and dispensing mechanism supported by said housing and including a fan and a suction housing cooperating for taking up the top most card body from a stack of card bodies on said movable base and a small ruber wheel for sending out the card which is taken up at said fan.

8. A card body dispenser according to claim 7, wherein said connection part comprises a protruding part on each side of said base and said connection element comprises grooves, including a groove on each of two facing interior sides of said frame, said grooves each receiving a protruding part slidably, as said cassette is positioned in said card cassette space.

9. A card body dispenser according to claim 7, further comprising a card cassette for hold a plurality of card bodies as a card body stack, said housing including facing boards defining a card cassette space, said movable base being movably mounted in said card body cassette and removably connected to said frame, said card body cassette being removably inserted into said card cassette space.

10. A card body dispenser according to claim 9, wherein said connection part comprises a protruding part on each side of said base and said connection element comprises grooves, including a groove on each of two facing interior sides of said frame, said grooves each receiving a protruding part slidably, as said cassette is positioned in said card cassette space.

* * * * *